T. E. ADAMS.
HORSE-POWER.

No. 187,501. Patented Feb. 20, 1877.

Charles J. Buchheit.
George H. Sykes.
Witnesses

Thomas E. Adams, Inventor
By Edward Wilhelm
Attorney.

UNITED STATES PATENT OFFICE.

THOMAS E. ADAMS, OF NORTH EVANS, NEW YORK.

IMPROVEMENT IN HORSE-POWERS.

Specification forming part of Letters Patent No. 187,501, dated February 20, 1877; application filed December 6, 1876.

*To all whom it may concern:*

Be it known that I, THOMAS E. ADAMS, of North Evans, in the county of Erie and State of New York, have invented certain Improvements in Horse-Powers, which improvements are fully set forth in the following specification and accompanying drawing.

My invention relates to that kind of horse-powers which are provided with a horizontal band-wheel so arranged that the animal walks within the rim thereof.

The object of my invention is to provide an animal-power which is adapted for use in barns of ordinary size, for the purpose of driving feed-cutters, saws, and other barn implements, and which permits of the ready attachment of the draft-animals, and can be readily moved out of the way when not required for use; and my invention consists of the particular construction of the device, as will be fully set forth in the following description.

Figure 1:
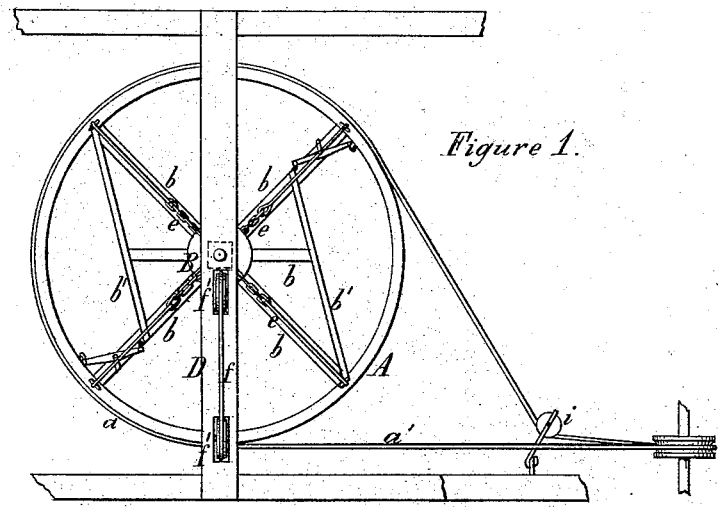
Figures 2, 3:
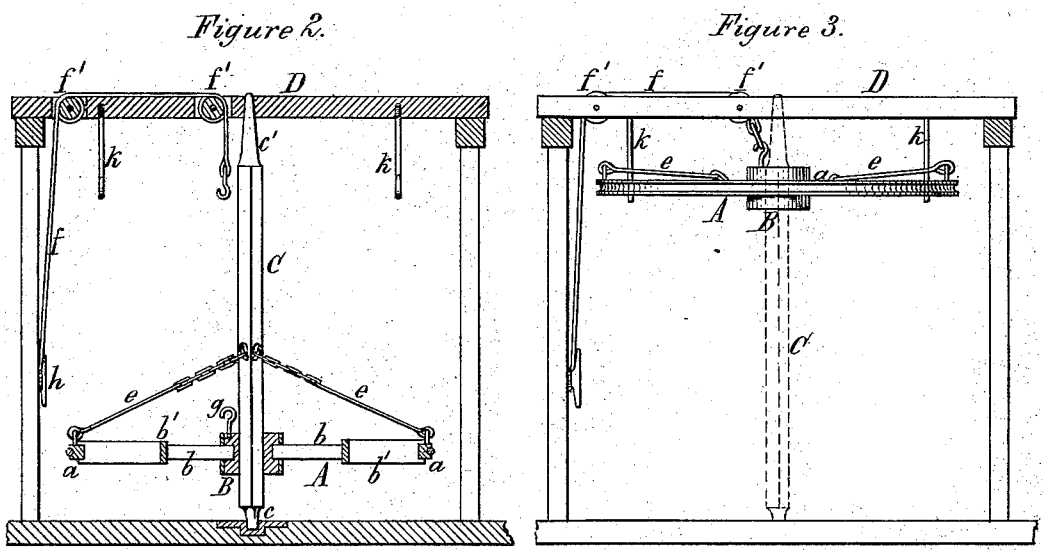

In the accompanying drawing, Figure 1 is a plan view of my improved horse-power. Fig. 2 is a sectional elevation thereof. Fig. 3 is a side elevation, showing the band-wheel raised out of the way.

Like letters of reference refer to like parts in each of the figures.

A represents the horizontal driving-wheel, having a grooved rim, $a$, in which runs the belt $a'$. B is the hub of the wheel A, and $b$ are the spokes thereof, one or more of which are cut off and connected to a cross-piece, $b'$, so as to leave a space for the accommodation of the draft animal or animals. C is the vertical post or shaft, preferably made square in cross-section, and provided at its lower end with a journal, $c$, resting on a step or bearing secured to the floor of the barn, and at its upper end with a long journal, $c'$, held loosely in a bearing formed in one of the cross-timbers D of the scaffold of the barn. The hub B of the wheel A slides loosely on the post C, so that the wheel can be adjusted vertically thereon. $e$ are guys connecting the wheel A to the post C, the upper ends of the guys being formed by chains engaging with hooks sunk into the post C, so that the wheel can be hung higher or lower, as may be required. $f$ is a rope running over pulleys $f'$, arranged overhead, and connecting, by means of a snap-hook or other device, with a hook or staple, $g$, secured to the hub B. The other end of the rope $f$ is secured to a cleat, $h$, arranged in convenient reach. $i$ is a tension-pulley, hung to one of the side timbers of the barn, so as to change the horizontal direction of the belt to a vertical one. The staple of the tension-pulley is made adjustable toward and from the wheel by engaging it with one of a series of holes, so that the tension of the belt can be regulated.

When the horse-power is not required to be used, the rope $f$ is connected with the staple $g$, and the guys $e$ disconnected from the post C, when the belt is thrown off and the wheel A raised by means of the rope $f$ to the under side of the cross-timbers of the scaffold of the barn, where it is securely held by two hooks, $k$, as shown in Fig. 3. The free end of the rope $f$ is preferably passed through the wheel A when hoisting the latter, when it can be shifted by means of the rope to one side or the other, as may be necessary.

When the wheel A is secured to the scaffold-timbers, the shaft C is raised so as to disengage it from its lower bearing, and then moved sidewise to withdraw it from its upper bearing, when the post is laid aside, thus leaving the entire barn-floor free and unobstructed.

When the power is required for use, the post C is inserted in its bearings, and the wheel A lowered to the floor. The draft-animal is stepped into the wheel and hitched thereto, when the wheel is raised by the rope $f$ to the proper height, and the free end of the rope secured. The guys $e$ are then secured to the post C, so as to firmly support the wheel in the position best suited to the size of the animal, when the rope $f$ is detached from the staple $g$, and the power is ready for use upon applying the belt. The strain of the band or belt $a'$ being received by the spokes and hub from all directions, the journals and bearings of the upright shaft C are subjected to comparatively light strains, of which the greater portion is received by the step-bearing on account of its greater proximity to the wheel.

When a square shaft is employed, the guys $e$ have only to support the weight of the wheel; but, if desired, a round shaft may be employed, when the guys will transmit the motion to the upright shaft. When the draft-animal is required to be unhitched, the rope $f$ is attached to the staple $g$ and the guys $e$ disconnected from the shaft, when the wheel is readily lowered to the ground to permit the animal to step out of the wheel.

My improved horse-power is very simple and cheap of construction, and, at the same time, very efficient and convenient.

Having thus fully described my invention, what I claim as my invention, and desire to secure by Letters Patent, is—

1. In a horse-power, the combination, with the upright shaft C, of the band-wheel A, made vertically adjustable thereon, so as to be lowered to the floor or ground, substantially as and for the purpose hereinbefore set forth.

2. In a horse-power, the combination, with the removable upright shaft C, of the detachable band-wheel A, adjustable guys $e$, and hoisting-rope $f$, substantially as and for the purpose hereinbefore set forth.

THOMAS E. ADAMS.

Witnesses:
 EDWARD WILHELM,
 GEORGE H. SYKES.